Aug. 27, 1968  W. E. MacLACHLAN  3,398,636
PROJECTOR TABLE FOR OVERHEAD PROJECTOR
Filed Dec. 27, 1965
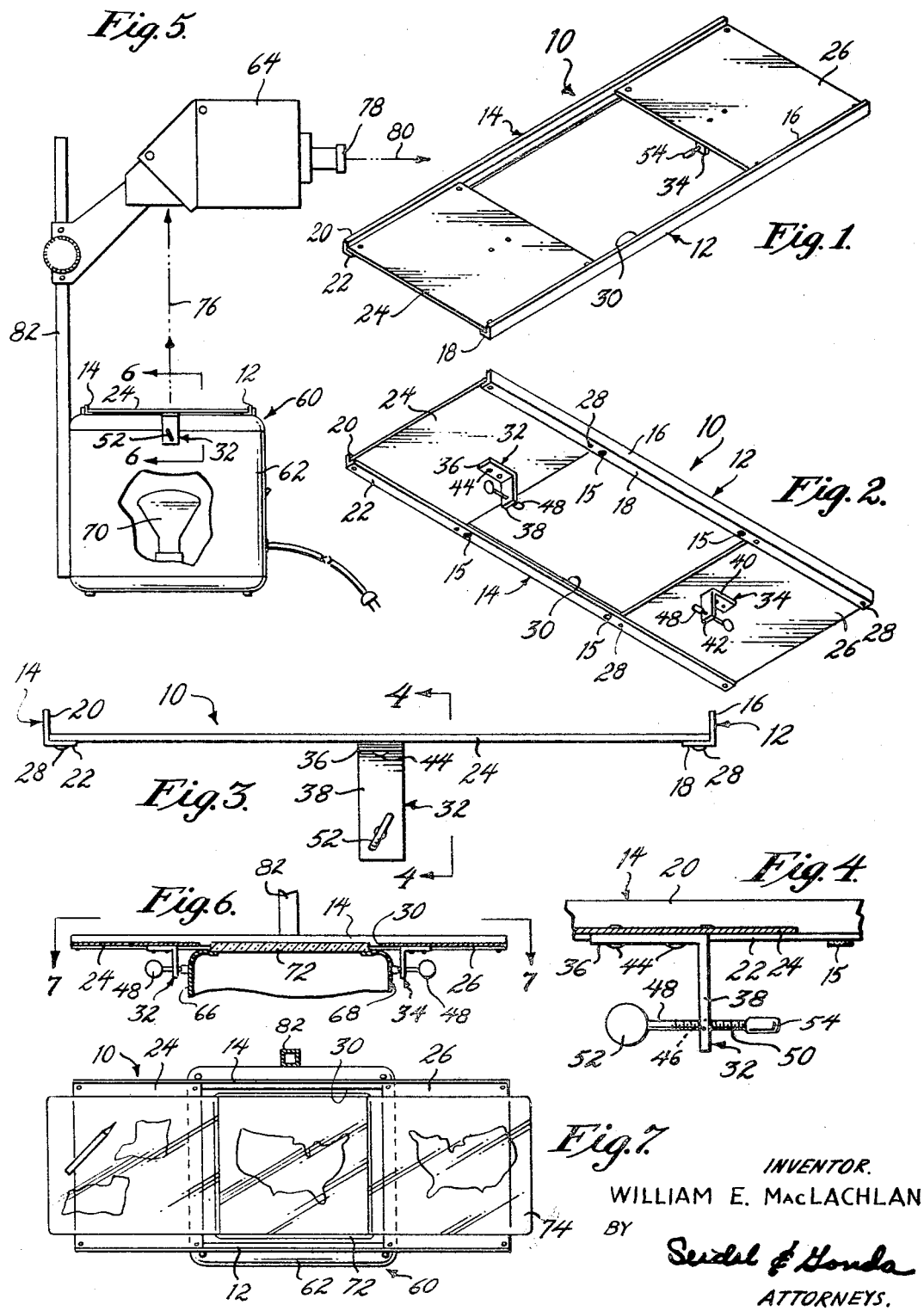
INVENTOR.
WILLIAM E. MacLACHLAN
BY
Seidel & Gonda
ATTORNEYS.

United States Patent Office 3,398,636
Patented Aug. 27, 1968

3,398,636
PROJECTOR TABLE FOR OVERHEAD PROJECTOR
William MacLachlan, Cherry Hill, N.J., assignor to Display Corporation of America, Philadelphia, Pa., a corporation of Pennsylvania
Filed Dec. 27, 1965, Ser. No. 516,509
6 Claims. (Cl. 88—24)

ABSTRACT OF THE DISCLOSURE

A projector table which is readily attachable to an overhead projector provides space upon which preceding and succeeding overlays relative to the one presently in use, may be placed. Two panels are interconnected by support members and brackets are provided on the underside of the support members for connecting the tray to the projector.

---

This invention relates to a projector table for an overhead projector and more particularly to a table support adapted to be connected to an overhead projector.

Prior art overhead projectors are compact and provide no space except for the glass cover upon which overlays can be placed. Furthermore, no space is provided upon which the overlay which has preceded the overlay being shown, or the overlay which is to succeed the overlay being shown can be readily placed.

It is an object of this invention to provide a novel projector table for an overhead projector.

Another object of this invention is to provide a projector table which can be easily and conveniently attached to an overhead projector.

Another object of this invention is to provide a projector table which is readily attached to an overhead projector and which provides space upon which preceding and succeeding overlays relative to the one presently in use, may be placed.

It is another object of this invention to provide a projector table which is easy to manufacture and highly attractive in appearance.

It is another object of this invention to provide a projector table for use with an overhead projector which has a simple yet effective connection means to said overhead projector.

It is another object of this invention to provide a projector table which provides two distinct surfaces for supporting overlay transparencies or other desired material.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a top perspective view of the projector table of this invention.

FIGURE 2 is a bottom perspective view of the projector table of this invention.

FIGURE 3 is an end view of the projector table of this invention.

FIGURE 4 is a section view taken along line 4—4 on FIGURE 3.

FIGURE 5 is a side view of an overhead projector with the novel projector table of this invention in place.

FIGURE 6 is a section view taken along line 6—6 on FIGURE 5

FIGURE 7 is a section view taken along line 7—7 on FIGURE 6 showing a series of overlay transparencies on the projector table of this invention.

In FIGURE 1 there is illustrated a projector table support in accordance with the present invention designated generally as 10.

The table 10 includes support members 12 and 14. The support members 12 and 14 may be identical in construction. The support members 12 and 14 are provided with upwardly projecting legs 16 and 20 and laterally projecting legs 18 and 22. The respective legs may be integrally joined to define L-shaped support members. The bottom of the support members 12 and 14 may be provided with felt pads 15.

The support members 12 and 14 are adapted to support a pair of panel members 24 and 26. The panel members may be secured to the support members 12 and 14 by any well known means, as for example the rivets 28. The panels may be secured in any other convenient manner without departing from the spirit and scope of this invention.

To enhance the attractiveness of the projector table, the panels 24 and 26 may be composed of Masonite having a simulated wood grain. Other suitable materials may be used.

The panel members 24 and 26 are spaced apart from each other and define a central rectangular opening 30. The opening 30 is provided so that projector table can be readily mounted on an overhead projector and used therewith. The opening 30 preferably conforms in shape to that of glass cover 72. The opening preferably is square and 10½ inches on a side.

As illustrated in FIGURES 2–4 a pair of L-shaped brackets 32 and 34 are connected to the bottom of the panels 24 and 26 respectively. The L-shaped brackets 32 and 34 have first members 36 and 40 which abut the undersides of the panels 24 and 26 respectively. The connecting brackets 32 and 34 have second members 38 and 42 which extend substantially perpendicularly from said first members 36 and 40 respectively. The L-shaped connecting brackets 32 and 34 may be connected to the panels 24 and 26 respectively by means of rivets 44 or by any other suitable connecting means.

Each of the second members 38 and 42 are provided with a threaded hole 46. A screw member 48 is adapted to be inserted into each of the holes 46. Each screw member 48 is provided with threads 50 thereon. Each of the screw members 48 is provided with a finger grip 52 at one end. The finger grips 52 are adapted to be readily engaged by the fingers of a user of the projector table. The finger grips 52 may be flat members as shown or spherical to move the screw members in the threaded holes 46 relative to the brackets 32 and 34. The end of the screws 48 remote from the grips 52 are provided with resilient protective caps 54. It is within the scope of this invention to mount one of the screw members 48 fixedly in a hole 46 and to provide movement for only one of the screw members 48 relative to the fixed screw member.

Referring now to FIGURES 5–7, there is illustrated an overhead projector designated generally as 60. The projector 60 is provided with a base portion 62 and a top portion 64. The base portion 62 is provided with side members 66 and 68. A conventional light source 70 is provided in the base 62 of the projector 60. The base 62 is provided with a glass cover 72 through which the light from source 70 is directed. The glass cover 72 is adapted to receive overlay transparencies such as those designated as 74 in FIGURE 7. The light source 70 includes lenses and is adapted to project the image of the overlay 74 in the direction of the arrow 76 to a reflecting surface (not shown). Thereafter, the image is reflected through the lens 78 in the direction of the arrow 80 and focused upon a screen or other suitable surface. The projector 60 is provided with a support bar 82 so that the top portion 64 of the projector is adjustable. The overhead projector 60 is utilized in the conventional manner.

The projector table of this invention is utilized in the following manner. The table 10 is mounted over the base of the projector 60 so that the central opening 30 is placed over the glass cover 72. On most conventional projectors, the glass cover 72 is square in shape and each side thereof is approximately 10 inches long. The innermost edge of each of the panels 24 and 26 engages the top of the base 62 of the projector 60. Thereafter, either one or both of the screw members 48 are rotated so that the screw members 48 firmly engage the sides 66 and 68 of the base portion 62 of the projector 60. Thereafter, the projector table 10 is ready for use and transparencies such as those indicated at 74 can be placed upon the panels 24 and 26. The panels 24 and 26 may be utilized to support transparencies or to provide the surface upon which work can be done. When it is desired to move the projector table 10, it is only necessary to unscrew either one or both of the screw members 48 and remove the table 10 from the base portion 62 of the projector 60.

Thus, it is readily seen that a convenient and useful projector table is provided by this invention. The projector table of this invention is highly attractive in appearance and is readily adaptable to all conventional overhead projectors. Furthermore, the width of the panels of the projector table are chosen so that the top of the panels are substantially level with the glass cover provided on the base portion of the projector.

The edges of the panel members 24 and 26 which cooperate to define the opening 30 may hereinafter be referred to as interior end faces. The edges of the panels opposite the interior end faces may hereinafter be referred to as exterior end faces.

The present invention may be embodied in other specific forms without departing from the spirit or essential attributes, thereof and, accordingly, reference should be made to the appended claims, rather than to the foregoing specification as indicating the scope of the invention.

I claim:

1. A projector table comprising a pair of spaced apart L-shaped support members, a pair of panels having a top and an underside and interior end faces and exterior end faces, said panels being fixedly connected to said support members, each of said panels being connected to each of said support members at opposite ends of said support members, said support members extending to substantially the exterior end faces of said panels, said panels being spaced apart from one another, an opening defined by the interior end faces of said panels and said support members, a pair of L-shaped brackets, fixedly connected to the underside of said panels and spaced from the edges thereof, said L-shaped brackets having threaded holes therein, and a pair of threaded screw members threadedly engaged in said holes.

2. A projector table as set forth in claim 1, wherein said opening defined by the interior end faces of said panels and said support members has a generally square shape and said interior end faces and a portion of said support members defining said opening each being approximately 10½ inches in length.

3. A projector table as set forth in claim 1 wherein said threaded screw members have flat portions on one end thereof adapted for convenient engagement, and the other end of said threaded screw members having protective caps thereon.

4. A projector table as set forth in claim 1 wherein said panels are composed of Masonite having a wood grain and said table is adapted to be cooperatively engaged with an overlead projector.

5. A projector table as set forth in claim 4 wherein said panels are adapted to support overlays and said panels are fixedly connected to said support members by means of rivets and said L-shaped brackets are fixedly connected to said panels by means of rivets.

6. A projector table as set forth in claim 1 wherein said projector tray is adapted to be attached to an overhead projector having a glass cover, said panels when said table is attached to said overhead projector being adapted to substantially abut said glass cover on said projector.

References Cited
UNITED STATES PATENTS

| | | | |
|---|---|---|---|
| 2,813,457 | 11/1957 | Fitzgerald | 88—24 |
| 1,575,954 | 3/1926 | Walaschek | 108—90 |
| 2,092,441 | 9/1937 | Ciprus | 108—90 |
| 2,468,962 | 5/1949 | Czak | 108—90 |
| 3,264,936 | 8/1966 | Schultz et al. | 88—240 |

NORTON ANSHER, *Primary Examiner.*

R. M. SHEER, *Assistant Examiner.*